(12) United States Patent
Grasser

(10) Patent No.: US 9,405,171 B2
(45) Date of Patent: Aug. 2, 2016

(54) LASER ILLUMINATION DEVICE WITH INTEGRATED SHUTTER

(71) Applicant: Compagnie Industrielle des Lasers CILAS, Orleans (FR)

(72) Inventor: Regis Grasser, Olivet (FR)

(73) Assignee: Compagnie Industrielle des Lasers CILAS, Orleans (FR)

(*) Notice: Subject to any disclaimer, the term of this patent is extended or adjusted under 35 U.S.C. 154(b) by 0 days.

(21) Appl. No.: 14/276,446

(22) Filed: May 13, 2014

(65) Prior Publication Data

US 2014/0341555 A1   Nov. 20, 2014

(30) Foreign Application Priority Data

May 14, 2013  (FR) .................................. 13 01102

(51) Int. Cl.
| G03B 11/00 | (2006.01) |
| G03B 15/05 | (2006.01) |
| G03B 17/12 | (2006.01) |
| G01S 17/10 | (2006.01) |
| G01S 17/89 | (2006.01) |
| G01S 7/486 | (2006.01) |
| G03B 9/70  | (2006.01) |

(52) U.S. Cl.
CPC .............. *G03B 15/05* (2013.01); *G01S 7/4861* (2013.01); *G01S 7/4863* (2013.01); *G01S 17/107* (2013.01); *G01S 17/89* (2013.01); *G03B 9/70* (2013.01); *G03B 17/12* (2013.01)

(58) Field of Classification Search
USPC .............................. 396/180, 544; 356/28, 318
See application file for complete search history.

(56) References Cited

U.S. PATENT DOCUMENTS

| 5,907,150 | A   | 5/1999  | Saldana |
| 6,573,981 | B2* | 6/2003  | Kumagai et al. ............. 356/4.08 |
| 2004/0076415 | A1* | 4/2004 | Da Silva ........................ 396/25 |
| 2005/0269481 | A1 | 12/2005 | David et al. |
| 2011/0181864 | A1 | 7/2011 | Schmitt et al. |
| 2014/0158869 | A1* | 6/2014 | Keller ........................... 250/216 |

FOREIGN PATENT DOCUMENTS

EP          0 844 495 A1    5/1998

OTHER PUBLICATIONS

French Preliminary Search Report of Application No. 1301102.

* cited by examiner

*Primary Examiner* — Minh Phan
(74) *Attorney, Agent, or Firm* — Sughrue Mion, PLLC

(57) ABSTRACT

The device (1) comprises a controllable illumination module (2) comprising a laser source (3) capable of emitting a laser pulse, a controllable high-speed shutter (5), and an activatable control unit (6) which controls said illumination module (2) and said shutter (5) simultaneously, and which synchronizes the generation of laser pulses by the illumination module (2) and the opening of the shutter (5) so as to move said shutter (5) into an open position, an adjustable time lag after the generation of a laser pulse, and this over an adjustable opening period, said illumination module (2) and said shutter (5) forming part of an assembly (12) having mechanical integrity.

12 Claims, 1 Drawing Sheet

LASER ILLUMINATION DEVICE WITH INTEGRATED SHUTTER

The present invention relates to a laser illumination device with integrated shutter. It also relates to an active observation system comprising such a laser illumination device, particularly for defence and security applications.

Within the scope of the present invention an active observation system is configured to illuminate a scene by means of a laser source, in order to improve the quality of an image from said scene of the environment and/or bring to the fore specific details, such as point optics for example.

Thus, said active observation system comprises a laser source with a specific optical system for shaping the beam and a receiver camera for creating an image of the illuminated scene. A feature of an active system such as the one under consideration is its ability to illuminate only a small area of space.

To achieve this, the camera is sensitive to the incoming light for a very short period of time, typically between 0.1 μs and 10 μs. If the laser illumination also has a short pulse, this combined with the short exposure time of the camera results in a selection of photons which corresponds to a much shorter displacement period.

In this case the generated image corresponds to an area of space (in distance) relative to the position of the active system (typically several tens to several hundreds of meters). The field of vision can thus not only be defined in planar form (according to the usual plane of vision), but also according to the distance to the active system, i.e. in terms of volume.

Cameras with very short exposure times are not common. Moreover, to obtain a reasonable quality and/or signal/noise ratio, it is necessary to reach a certain energy level of the laser image during the short pulse length. This requires a complex laser source, which is expensive and often unreliable.

A way of improving this situation is to acquire the image during exposure to multiple pulses. Thus the energy required to form an image can be divided into a plurality of relatively weak energy pulses, conforming in particular with the technology of semiconductor laser diodes.

However, cameras with a multi-exposure function are rare. This has resulted in active observation systems that are complex or limited.

Furthermore, the only type of camera that enables multi-exposure with a very short opening time is an intensifier tube as described in particular in documents U.S. Pat. No. 5,907,150 and U.S. Pat. No. 7,733,464. However, an intensifier tube of this kind only functions in a range (800-900 μm) relative to near infrared (0.75-1.4 μm) NIR (Near InfraRed). However, in the short wavelength infrared range (1.4-3 μm) SWIR (Short Wavelength InfraRed), conventional solutions use solid state lasers and a single laser pulse exposure.

The aim of the present invention is to overcome this disadvantage. It relates to a laser illumination device with integrated shutter which makes it possible to provide a multi-exposure function adapted to every type of camera and for every wavelength in the NIR and SWIR ranges.

Thus according to the invention, said laser illumination device with integrated shutter is remarkable in that:

it comprises:
  a controllable illumination module comprising at least one laser source which is able to emit at least one laser pulse;
  a controllable high-speed shutter which can be moved alternatively into an open position, in which it allows electromagnetic radiation comprising at least said laser pulse to pass through a passageway and into a closed position in which it prevents the passage of said electromagnetic radiation through said passageway.

Said shutter is oriented relative to the direction of emission of said laser pulse to receive through the passageway said laser pulse emitted by an element located in said direction of emission; and a control unit which can be activated, which controls simultaneously said illumination module and said shutter, and which synchronises the generation of laser pulses by the illumination module and the opening of the shutter so as to move said shutter into the open position, an adjustable time lag after the generation of a laser pulse, and this during a controllable opening period; and said illumination module and said high-speed shutter as well as preferably at least part of said control unit form part of an assembly having mechanical integrity.

Thus, by means of the invention a laser illumination device with integrated high-speed shutter is obtained, which is autonomous and independent and in the form of an assembly with mechanical integrity, as specified below. This illumination device provides laser illumination and enables multiple exposures of short duration in said illumination sent by a part of space, for any optical element (and in particular a camera) which is located behind said passageway of the integrated shutter.

Said laser illumination device can thus be connected to a detection camera to form an active observation system, as specified below. As a function of the time lag between the generation of the laser pulse by the laser source and the opening of said shutter, it is possible to determine the area of space in front of the device that is to be analysed. In this case, the detection camera is completely independent of said laser illumination device so that it is possible to use any type of camera (and in particular standard cameras).

The present invention has the following advantages in particular:

it makes it possible to extend the multi-exposure capacity from the NIR range to the SWIR range;

it significantly increases the ability of a camera or a connected sensor to create an active image; and it enables detection configurations which would otherwise be impossible.

The device according to the invention can use in the illumination module different conventional laser sources and in particular semi-conductor lasers or fibre lasers. Thus the illumination module can be easily adapted to the intended application. In particular, the energy per image, the field of vision and the wavelengths can be easily controlled by using an appropriate laser source, as specified below.

Furthermore, advantageously:

said illumination module comprises a means for shaping the laser beam; and/or said laser illumination module comprises means which make it possible to move said shutter into said open position and keep it there.

Furthermore, in an advantageous manner, said laser illumination device also comprises interface means enabling an operator to activate the control unit and to set the laser illumination device, by allowing him in particular to adjust the frequency of the laser pulse, said time lag and said opening period.

Furthermore, advantageously:

in a first embodiment variant, said interface means also form part of said assembly with mechanical integrity and formed by a single mechanical unit; and in a second embodiment variant, said interface means are offset, being connected in particular to the control unit by a data link, for example of the wired type or preferably wireless (by waves). This allows an operator who is remote from said laser illumination device to activate and control it.

The present invention also relates to an active observation system comprising a camera capable of capturing the image of a field of vision.

According to the invention, said active observation system is remarkable in that it also comprises a laser illumination device as specified above, and said laser illumination device is configured such that the camera captures the image, through the passageway of the shutter of the laser illumination device, of a field of vision illuminated by the illumination module.

In this way an active observation is obtained which makes it possible to generate a multi-exposure function adapted to any type of camera (such as a standard camera), enabling in particular the creation of an active image with any wavelength in the NIR and SWIR ranges. Advantageously, said high-speed shutter is able to generate openings for short periods so as to provide the camera with a multi-exposure function of short duration. Said camera can continue to function in the usual manner.

Furthermore, advantageously said active observation system also comprises means which are configured to attach said laser illumination device to said camera.

Furthermore, in a particular embodiment said interface means (of the offset type) form part of an interface unit of said camera, which is thus common to the camera and the laser illumination device, even if said two elements are two single independent assemblies. Said interface unit can also be offset in relation to these two single assemblies, and for example be integrated into a remote control station.

Furthermore, in an advantageous manner, said active observation system also comprises means making it possible to move said shutter into said open position and keep it there (in a passive state). In this case, the camera forming part of said active observation system can function in a conventional manner as if the laser illumination device were not mounted on said camera (whereas it is effectively mounted on the latter).

The Figures of the attached drawing illustrate how the invention can be configured. In the Figures the same reference numbers denote similar elements.

Figure 1:
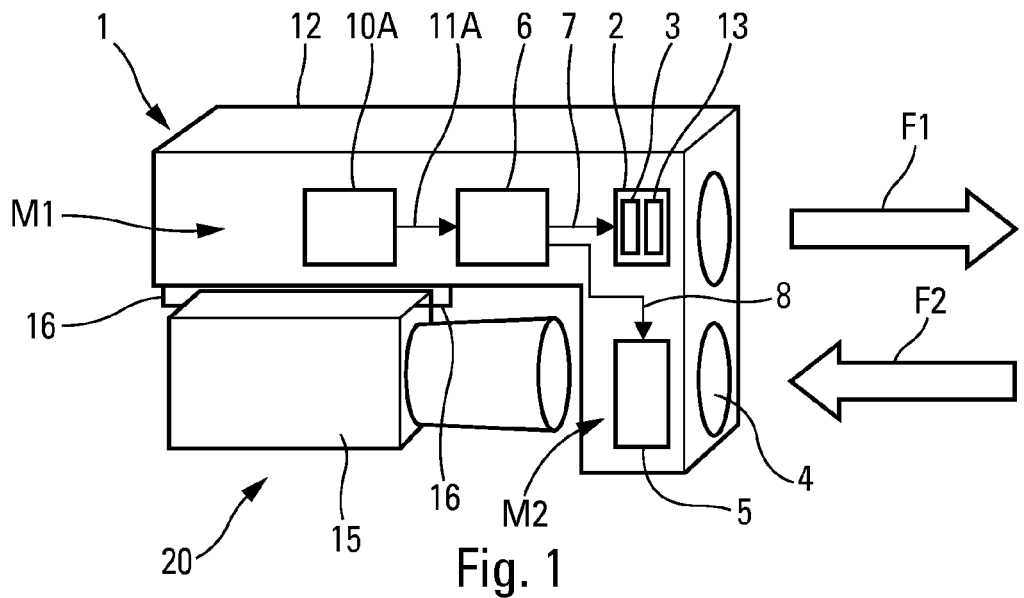
FIG. 1 shows schematically a laser illumination device with integrated shutter according to the invention.

The laser illumination device 1 with integrated shutter according to the invention and shown schematically in FIG. 1 is able to be connected to a camera or any other conventional sensor to form an active observation system 20, as specified below.

According to the invention, said laser illumination device 1 comprises:

a controllable illumination module 2 comprising at least one laser source 3 which is capable of emitting at least one laser pulse 10, as illustrated by an arrow F1 in FIG. 1;

a controllable high-speed shutter 5 which can be moved alternatively:

into an open position, in which it allows electromagnetic radiation comprising at least said laser pulse 10 to pass through a passageway 4, for example with a circular form, as illustrated by an arrow F2, after being reflected by a scene illuminated by the illumination module 2; and into a closed position, in which it prevents the passage of said electromagnetic radiation (comprising said laser pulse 10) through said passageway 4; and a control unit 6 which can be activated, which controls simultaneously said illumination module 2 and said shutter 5 respectively by means of connections 7 and 8, and which synchronises the generation of laser pulses 10 by the illumination module 2 and the opening of the shutter 5 so as to move said shutter 5 into the open position, an adjustable time lag DR after the generation of a laser pulse 10, and this during a controllable opening period DO.

Said illumination module 2 and said high-speed shutter 5 (as well as preferably at least a part of said control unit 6) form part of one and the same assembly 12 having mechanical integrity and comprising for example a single mechanical unit.

Moreover, said shutter 5 is oriented in relation to the direction of emission (arrow F1) of said laser pulse 10 so as to be able to receive through said passageway 4 the said laser pulse 10 sent by an element (not shown) located according to said direction of emission.

The laser source 3 and the shutter 5 are therefore controlled by the control unit 6 for generating illumination laser pulses 10 and shutter openings 5 which are synchronised (being temporarily offset).

Said laser illumination device 1 also comprises interface means 10A, 10B, 10C enabling an operator to activate the control unit 6 via a data link 11A, 11B, 11C, and to set the laser illumination device 1, by enabling him in particular to adjust the frequency of the laser pulse 10, said time lag DR and said opening time DO.

The device 1 therefore consists of two modules M1 and M2:

a first module M1 which corresponds to the illumination module 2 and which comprises the laser illumination source 3 and a usual means 13 for shaping the beam, as well as generally the electronic control unit 6; and a second module M2 which comprises the high-speed shutter 5 which is arranged in front of an optical receiving element, in particular a conventional camera.

Thus, the laser illumination device 1 with integrated high-speed shutter is autonomous and independent. Said illumination device 1 provides an illumination laser and enables multiple successive exposures of short duration to an illumination sent by part of the space, for every optical element (and in particular a camera) which is located behind said passageway 4 of the shutter 5. Said laser illumination device 1 can thus be connected in particular to a detection camera 15 to form an active observation system 20, as shown in FIG. 1.

The device 1 according to the invention can comprise different types of laser source 3 and in particular semi-conductor lasers or fibre lasers. Thus the illumination module 2 can easily be adapted to the intended application. In particular, the image energy, the field of vision and the wavelengths can be easily adjusted by using an appropriate conventional laser source 3.

By way of example, said shutter 5 can be designed to open and close at high frequencies (1 khz to 50 khz), each opening lasting a very short time (0.1 µs to 10 µs). To achieve this, said shutter 5 can comprise at least one Fabry-Perot cavity with an adjustable spacing, a nominal spacing allowing passage through said Fabry-Perot cavity for a laser beam (or pulse) with a frequency corresponding to said resonance frequency, adjustable activating means, of the piezo-electric type, able to vary said spacing, in a range of spacing values comprising said nominal value, and a control unit for controlling said activating means such that they vary the spacing according to a periodic function over time. The detection can be polarimetric (or not) if the shutter 5 is divided into two or a plurality of parts sensitive to different polarisation states.

In a first embodiment variant shown in FIG. 1, said interface means 10A also form part of said assembly 12 and are directly accessed by an operator on said assembly 12.

Figure 2:
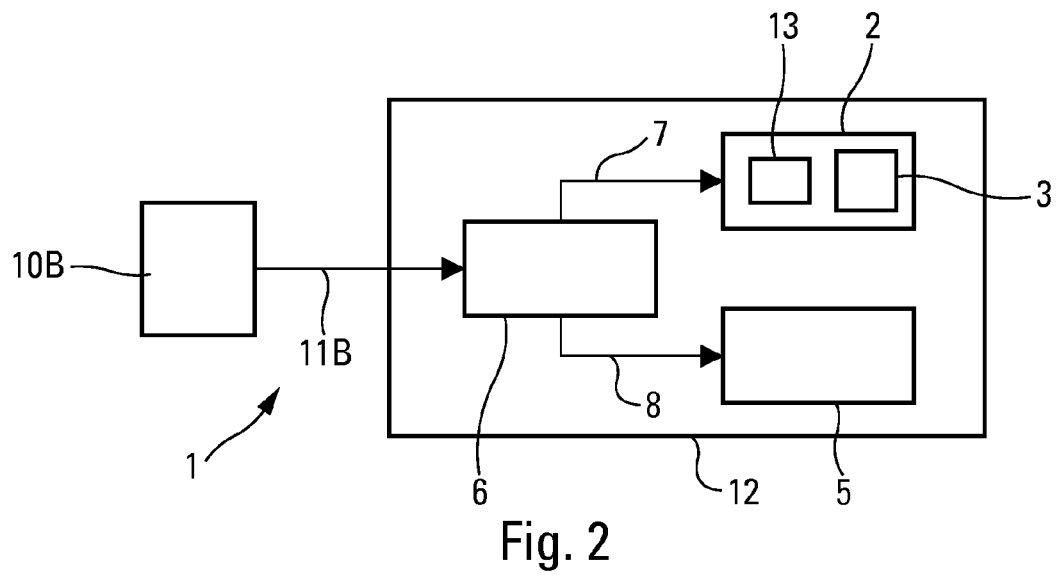
FIG. 2 shows the circuit diagram of the laser illumination device with integrated shutter according to the invention.
Figure 3:
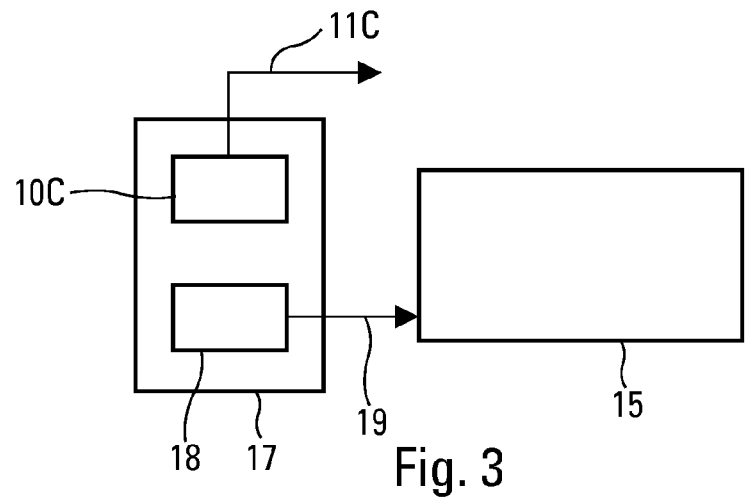
FIG. 3 illustrates schematically a particular interface unit.

In a second embodiment variant shown schematically in FIG. 2, said interface means 10B are offset (i.e. removed from the assembly 12), being connected to the control unit 6 by a data link 11B of the wired type or preferably of the wireless type (by waves). This enables an operator who is remote from said laser illumination device 1 to activate and control it remotely.

The present invention also relates to an active observation system 20 which comprises a camera 15 capable of capturing the image of a field of vision and which is configured to illuminate a scene by means of a laser source 3, in order to improve the quality of an image of said environmental scene and/or bring to the fore some specific details, such as point optics for example.

This active observation system 20 therefore comprises:
a camera 15 which is able to capture the image of a field of vision;
a laser illumination device 1 as mentioned above; and
means 16 (represented very schematically in FIG. 1) which are designed to attach said laser illumination device 1 to said camera 15. These means 16 which form part, at least partially, of the assembly 12 for example can comprise any kind of usual mechanical connection which is connected for example to an adaptation of the form of the assembly 12 to that of the camera 15.

In this application, the laser illumination device 1 is configured such that the camera 15 captures the image, through the passageway 4 of the shutter 5 of the laser illumination device 1, of a field of vision illuminated by the illumination module 2.

In this case, the detection camera 15 is completely independent of said laser illumination device 1 so that it is possible to use any type of camera 15.

The laser source 3 and the shutter 5 are controlled to generate laser illumination pulses I0 and shutter openings 5, which are synchronised. As a function of the time lag DR between the generation of the laser pulse 10 and the opening of said shutter 5 and the opening time DO, which times can be adjusted by an operator from interface means 10A, 10B, 10C, the operator can determine the area of space in front of the device 1 which is to be analysed by means of said system 20. The two modules M1 and M2 cooperate to supply suitable photons to the camera 15.

More precisely, the camera 15 can thus receive the incoming light over a very short time period (corresponding to the opening time of the shutter 5), typically between 0.1 μs and 10 μs.

The short exposure function is performed by the high-speed shutter 5. Thus the device 1 makes very short multi-exposures possible in conventional cameras 15 (of standard type). The opening period of the camera 15 is rather long as usual, typically from several milliseconds to several tens of milliseconds. The high-speed shutter 5 placed in front of the camera 15 allows light to pass from the scene in the required manner and for the required period, in order to achieve the desired multi-exposure function.

If the laser illumination also uses a short pulse, the combination with the short exposure time of the camera 15 (corresponding to the opening period of the shutter 5) results in a selection of photons which corresponds to a rather restricted displacement period. In this case, the generated image corresponds to an area of space (in distance) in relation to the position of the active system 20 (typically several tens to several hundreds of meters). The field of vision can thus not only be defined in planar form (according to the usual plane of vision), but also according to the distance to the active system, i.e. in terms of volume.

A multi-pulse exposure is thus possible whatever camera 15 is used. The system 20 can thus handle any wavelength in the NIR and SWIR ranges as long as the camera 15 is sensitive to this range. The camera 15 can continue to function in the normal manner.

Furthermore, said device 1 also comprises means (integrated and not shown) which are controlled for example by said interface means and which make it possible to move said shutter 5 into its open position and keep it there (corresponding to a passive state of the device 1). In this case, the camera 15 forming part of the said active observation system 20 can function in the usual manner as if the laser illumination device 1 were not mounted on said camera 15.

In one particular embodiment, said interface means 10C (of the offset type) can form part of an interface unit 17 comprising the conventional interface means 18 of said camera 15 (connected by a link 19 to the latter). Said interface unit 17 is thus common to the camera 15 and the assembly 12 of the laser illumination device 1, although these two elements 12 and 15 are otherwise two independent and separate unit assemblies. Said common interface unit 17 can be mounted on the camera 15 or on the assembly 12. It can also be offset in relation to these two single assemblies 12 and 15, being arranged at a control station enabling the remote control of the system 20.

With regard to the functioning of the system 20, an operator can set the laser illumination device 1 by means of the interface means 10A, 10B, 10C, which enables him to adjust the frequency of the laser pulse 10 in particular, the time lag DR and opening time DO. It is then sufficient for him to trigger a shot by means of the interface means 10A, 10B, 10C, said shot corresponding to the emission of a laser pulse 10 being generally reproduced periodically.

Synchronised with the laser source 3, the shutter 5 opens and closes rapidly at a time after emission corresponding to the time lag DR entered by the operator (or corresponding to a predetermined value), and this occurs during an opening time DO entered by the operator (or corresponding to a predetermined value). The camera 15, the optical detection element of which is arranged behind the passageway 4 of the shutter 5 therefore receives the laser pulse I0 which the shutter 5 let through while open, and it can detect and handle said received laser pulse 10 in the usual manner.

The present invention has the following advantages in particular:
it makes it possible to extend the multi-exposure capacity from the NIR range to the SWIR range without developing specific sensors and/or cameras 15;
it significantly increases the ability of a camera 15 or an associated sensor to generate an active image; and
it enables detection configurations which would otherwise be impossible.

The invention claimed is:

1. Laser illumination device with integrated shutter designed to be connected to an independent camera (15), said device (1) comprising:
a controllable illumination module (2) comprising at least one laser source (3) capable of emitting at least one laser pulse;
a controllable high-speed shutter (5) which can be moved alternatively into an open position in which it allows electromagnetic radiation comprising at least said laser pulse to pass through a passageway (4), and into a closed position in which it prevents the passage of said electromagnetic radiation through said passageway (4); and an activatable control unit (6), coupled to said illumination module (2) and said shutter (5), which controls said illumination module (2) and said shutter (5) simultaneously, and which synchronises the generation of laser pulses by the illumination module (2) and the opening of the shutter (5) so as to move said shutter (5) into the open position, and which controls an adjustable time lag after the generation of a laser pulse during, an adjustable opening period, wherein at least said illumination module (2), said shutter (5) and said control unit (6) form part of an assembly (12) having mechanical integrity, and in that said laser illumination device (1) also comprises attachment means for attaching said assembly (12) to the camera (15), and wherein said camera (15) is independent from said assembly (12) and removably attached thereto via the attachment means.

2. The laser illumination device according to claim 1, wherein said illumination module (2) comprises a means (13) for generating the shape of the laser beam.

3. The laser illumination device according to claim 1, further comprising interface means (10A, 10B, 10C) allowing an operator to activate the control unit (6) and set the laser illumination device (1).

4. The laser illumination device according to claim 3, wherein said interface means (10A) form part of said assembly (12) having mechanical integrity.

5. The laser illumination device according to claim 3, wherein said interface means (10B, 10C) are offset in relation to said assembly (12) having mechanical integrity.

6. The laser illumination device according to claim 1, further comprising means for moving said shutter (5) into said open position and keeping it there.

7. Active observation system comprising:
a camera (15) capable of capturing the image of a field of vision, and
a laser illumination device with integrated shutter, said laser illumination device being independent from the camera and comprising:

a controllable illumination module (2) comprising at least one laser source (3) capable of emitting at least one laser pulse, a controllable high-speed shutter (5) which can be moved alternatively into an open position in which it allows electromagnetic radiation comprising at least said laser pulse to pass through a passageway (4), and into a closed position in which it prevents the passage of said electromagnetic radiation through said passageway (4), and an activatable control unit (6), which is coupled to said illumination module and said shutter and which controls said illumination module (2) and said shutter (5) simultaneously, and which synchronises the generation of laser pulses by the illumination module (2) and the opening of the shutter (5) so as to move said shutter (5) into the open position, and which controls an adjustable time lag after the generation of a laser pulse during, an adjustable opening period; and attaching means for removably attaching the camera to the illumination module (2), wherein at least said illumination module (2), said shutter (5) and said control unit (6) form part of an assembly (12) having mechanical integrity which is independent of said camera which is removable therefrom.

8. The active observation system according to claim 7, further comprising interface means (10C) which forms part of an interface unit (17) of said camera (15).

9. The active observation system according to claim 8, wherein said interface unit (17) is offset.

10. The active observation system according to claim 7, wherein said shutter (5) is configured to generate openings for a short period so as to provide the camera (15) with a function of short multiple exposures.

11. The laser illumination device according to claim 1, wherein said shutter is configured to open and close at high frequencies ranging from 1 khz to 50 khz, each opening lasting in a range of 0.1 μs to 10 μs.

12. The active observation system according to claim 7, wherein said shutter is configured to open and close at frequencies ranging from 1 khz to 50 khz, each opening lasting in a range of 0.1 μs to 10 μs.

* * * * *